Figure 1:
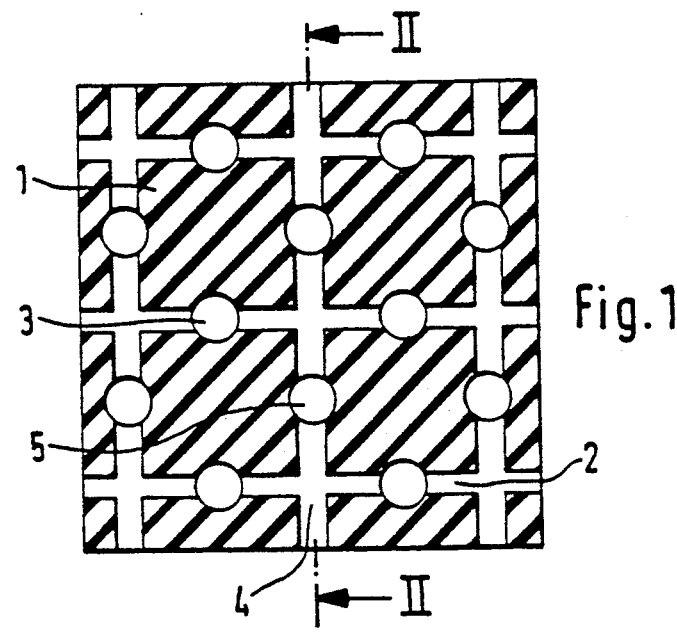

United States Patent [19]

Wolf et al.

[11] Patent Number: 5,110,660

[45] Date of Patent: May 5, 1992

[54] RUBBER SPRING ELEMENT

[75] Inventors: Franz J. Wolf; Hubert Pletsch, both of Bad Soden-Salmünster, Fed. Rep. of Germany

[73] Assignee: WOCO Franz-Josef Wolf & Co., Bad Soden-Salmunster, Fed. Rep. of Germany

[21] Appl. No.: 454,483

[22] Filed: Dec. 21, 1989

[30] Foreign Application Priority Data

Jan. 23, 1989 [DE] Fed. Rep. of Germany ....... 3901897

[51] Int. Cl.$^5$ ............................ B32B 1/00; F16F 7/00
[52] U.S. Cl. ..................................... 428/178; 428/188;
428/313.5; 428/314.2; 428/314.8; 428/492;
264/166; 264/167; 264/209.1; 264/319;
264/328.1; 181/208; 248/615; 248/634;
248/638; 267/140; 267/141; 267/153; 267/292
[58] Field of Search ............... 428/188, 166, 158, 178,
428/304.4, 492, 192, 313.5, 314.2, 314.8;
267/269, 141, 140.1, 140, 153, 292; 181/207,
208, 288; 248/615, 638, 562, 634; 264/45.1,
46.6, 563, 166, 167, 209.1, 319, 321, 328.1

[56] References Cited

U.S. PATENT DOCUMENTS 4,776,573 10/1988 Wolf et al. ..................... 267/140.1

FOREIGN PATENT DOCUMENTS 0187888 12/1987 European Pat. Off. .
52-37675 3/1977 Japan .

Primary Examiner—Ellis P. Robinson
Assistant Examiner—Donald J. Loney
Attorney, Agent, or Firm—Lowe, Price, LeBlanc & Becker

[57] ABSTRACT

In order to obtain a particularly soft spring characteristic the rubber spring element consisting of relatively hard material having good mechanical strength is traversed by cavities and hollow channels, which intersect said cavities, in such a manner that the area of the inside cross-section of the hollow channels amounts to at least 25% of the area of the largest inside cross-section of the nearest cavity traversed by this hollow channel, while the hollow channels may directly intersect in the rubber matrix.

11 Claims, 1 Drawing Sheet

RUBBER SPRING ELEMENT

DESCRIPTION

The invention relates to a rubber spring element of the kind indicated in the preamble of claim 1, and also to a method of producing a spring element of this kind.

From European Patent Specification EP 187 888 a rubber spring element of this kind is known which consists of a rubber block traversed by hollow channels and cavities. The cavities formed in the rubber block, which in particular are spherical and uniformly distributed, are traversed by the hollow channels in such a manner that each of the cavities is traversed by only one of the hollow channels. The hollow channels cross one another in space at different heights, but without intersecting. The hollow channels thus form groups of hollow channels, each group lying in one plane and the groups being disposed with surfaces parallel to one another. The cavities are distributed in the rubber matrix in such a manner that they form a body-centered cubic lattice.

In a rubber spring element made in the form of a rubber buffer or support from a hollow rubber block of this kind a support connector and an abutment connector, usually a steel plate with threaded pins or an internally threaded member, are disposed planarly opposite one another on opposite surfaces of the rubber block which lie parallel to one another, in such a manner that they are aligned parallel to the groups of hollow channels.

Even when made of a relatively hard rubber, a rubber spring element of this kind will have a relatively soft spring characteristic because of the hollow channels and cavities, and in addition, because of the arrangement of the cavities, will be able to effect the acoustic decoupling of the support and the abutment from one another in a surprisingly effective manner.

If with a rubber spring element of this kind it is desired to ensure a linear working range with the greatest possible additional softness, but on the other hand to avoid in all circumstances the buckling of the inner occurrence of the so-called buckling effect, limits are placed on the distribution density and dimensions of the cavities and hollow channels in the rubber block.

The surprising acoustic and mechanical properties of the known rubber spring element have led to its rapid acceptance in practice, particularly in automobile production, since it permits the reliable soft springing of relatively great masses. At the same time, with increasing improvement of spring travel limitation in the developed bearings, the desire for still softer characteristics was inevitable.

Taking as starting point this prior art and the desire expressed by the designers concerned for still softer characteristics for rubber spring elements of this kind, the problem underlying the invention is that of so improving a spring element of the kind first described above that, without reducing the material strength of the matrix rubber and without allowing a buckling effect or giving up other desirable properties, the rubber spring elements in question can be obtained with still softer spring characteristics.

For the solution of this problem the invention provides a rubber spring element of the kind first indicated above which, according to the invention, has the features shown in the characterizing part of claim 1.

Developments of this rubber spring element are the subject of subclaims 2 to 10.

A method for the production of the rubber spring element is the subject of claim 11.

The solution, which in the light of previous experience with the rubber spring element first described above is definitely astonishing, to the problem underlying the present invention therefore consists in that the hollow channels are shaped, relative to the cavities traversed by them, with the largest possible inside channel cross-section in comparison with the cavities, that is to say, put more accurately, in such a manner that the area of the inside cross-section of the hollow channels at right angles to their longitudinal axis amounts to at least substantially a minimum of 25% of the area of the largest inside cross-section of the nearest cavity traversed by this hollow channel, and that the hollow channels complying with these dimension limits then directly intersect in the rubber matrix. The surprising feature of this arrangement is that rubber spring elements of this kind, when they carry loads to be sprung with an imposed load vector at right angles to the planes of the groups of channels, show no buckling effect in the spring characteristics. The acoustic decoupling of support and abutment is here retained practically unchanged as long as the area of the inside cross-section of the hollow channels does not exceed 85% of the area of the largest inside cross-section of the nearest cavity traversed by this hollow channel. With hollow channel cross-sections exceeding about 80% of the cross-sectional area of the largest inside cross-section of the nearest cavity traversed by the hollow channel in question, the additional acoustic decoupling between the support and the abutment decreases, in order that when the cross-sections of the hollow channels and of the cavities are the same, that is to say when to all intents and purposes there are no longer any cavities in the rubber matrix and only the groups of hollow channels traverse the latter, this additional acoustic decoupling can no longer be detected as a useful effect.

In other words, the area of the inside cross-section of the hollow channels is thus preferably in the range of at least substantially a minimum of 25% and not above at least substantially 80% of the area of the largest inside cross-section of the nearest cavity traversed by the hollow channel in question. The actual nub of the present invention is that hollow channels dimensioned in this manner relative to the cross-sections of the cavities can therefore also perfectly well intersect in the rubber matrix and therefore provide a further softening of the spring characteristic, even for a rubber matrix made of relatively hard material, without giving rise to buckling effects.

With this arrangement of the hollow channels in the rubber matrix the hollow channels can in principle intersect both in the cavities themselves, that is to say they can conjointly lead into one and the same cavity, and intersect directly, that is to say outside the cavities. In this case preferably not more than two, and definitely not more than three, hollow channels should meet and intersect at these direct channel intersection points. These intersection points are then preferably distributed in the rubber matrix in such a manner that on the one hand they are mutually staggered in space, but that on the other hand they are also staggered relative to the cavities themselves, so that relative to the latter they form a sublattice offset by half a side length of the lattice.

In contrast to the space lattice networks having groups of hollow channels parallel to one another, that is to say in contrast to cubic, hexagonal or tetragonal structures of the distribution of the cavities in the rubber matrix, in which the channels intersect mostly directly, that is to say outside the cavities, and mostly only in pairs, in the case of radial arrangement and distribution of the cavities and hollow channels, for example in a cylindrical rubber block, the channels are so designed and arranged that, while forming a channel group stratification lying at least substantially in the radial planes, they lead into a comparatively wide central hollow channel which extends through the entire rubber block and is preferably open at both ends.

Structures of a similar type for a planar rubber damper filled with damper fluid are known from Japanese Preliminary Published Application JP 52-37675 A. The cavities are in the form of upright regular cylinders which are connected together by thin throttle channels, which also intersect in the plane structure of a regular hexagonal lattice, namely in the cavities. These dampers are produced by first making two separate rubber injection moldings, which in a second operation are then joined together over their surface areas. A process of this kind is completely unsuitable for the mass production of rubber spring elements for use, for example, in the automobile industry.

According to the invention this problem is solved by producing the rubber spring block, which the cavities and hollow channels traverse, by compression molding or injection molding of a rubber mixture which has not yet been crosslinked, in a mold nest of an injection molding tool, wherein mold cores traverse the mold nest, while for the purpose of producing the intersection points of the hollow channels use is preferably made of reusable pushed steel mold cores. These steel mold cores can be pulled without difficulty even in the production of rubber spring elements of large volume, particularly also when they are conjointly pulled in blocks.

The rubber spring element is obtained ready for use directly after extraction from the mold.

Figure 2:
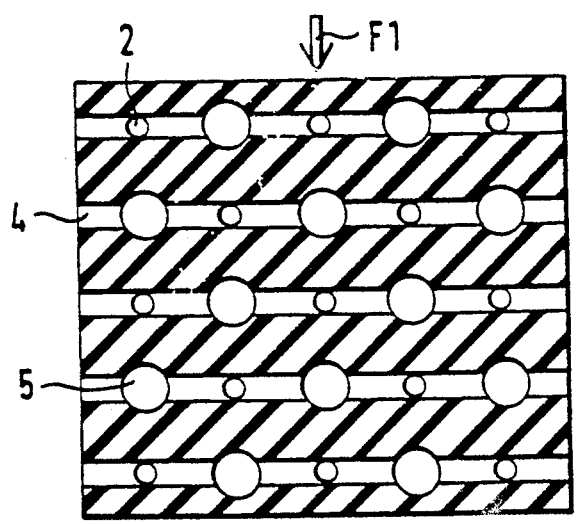
Figure 3:
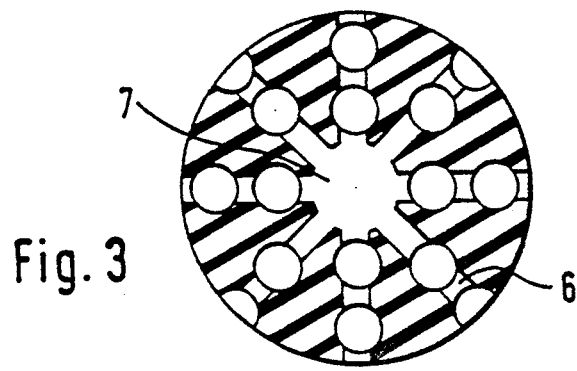

The invention is explained more fully below with the aid of exemplary embodiments and with reference to the drawing, in which:

FIG. 1 shows in section and plan view a spring element according to the invention, FIG. 2 shows a section on the line II—II in FIG. 1, and FIG. 3 shows another example of construction of the rubber spring element with radial distribution of the hollow channels and cavities.

A first exemplary embodiment of the rubber spring element according to the invention is shown in FIG. 1 in horizontal cross-section and in vertical plan view on this section, two groups of hollow channels parallel to one another intersecting in said element orthogonally in one and the same plane in space.

More specifically, the rubber block forming the rubber matrix 1 is traversed by a first group of hollow channels 2, which are parallel to one another and which in turn central-symmetrically traverse spherical cavities 3 disposed symmetrically and orthogonally.

A second group of hollow channels 4 is formed in the rubber matrix 1 orthogonally to said group of hollow channels 2, and traverses, likewise central-symmetrically, cavities 5 likewise disposed at regular intervals. In this arrangement the lattice formed by the regular distribution of the cavities 5 can be regarded as an intermediate lattice or sublattice of the cubic lattice of the cavities 3. However, the decisive factor in this respect is not primarily the symmetry of the individual lattices or their mutual allocation, but rather the fact that overall a regular distribution of the cavities and channels in the rubber matrix is ensured.

FIG. 2 also shows the load vector, or more accurately the imposed load vector F1, which in the construction illustrated is preferably at right angles to the stratified channel group planes, that is to say at right angles to the sectional plane shown in FIG. 1.

In the manner illustrated in FIG. 3 the individual channels 6 are so arranged in a cylindrical block as rubber matrix, which in FIG. 3 is shown in plan view on a cross-section, that, while being open at both ends, they lead jointly into a central bore 7 which extends from one end face to the other and is open at both ends. The center axis of the central bore 7 is so to speak the geometrical locus of the intersection points of the radially disposed hollow channels 6. The rubber spring element shown in FIG. 3 is designed for an imposed load which is to be sprung and whose imposed load vector is parallel to the center axis of the central bore 7.

The abstract accompanying the present description is regarded as a component part of the original disclosure.

We claim:

1. A rubber spring element consisting of a rubber matrix traversed by hollow channels and cavities in such a manner that each of the cavities formed in the rubber matrix is traversed by at least one of the hollow channels, wherein the area of the inside cross-section of the hollow channels, given the same alignment of the planes of section at right angles to the longitudinal direction of the hollow channels, amounts in each case to at least 25% of the area of the largest inside cross-section of the nearest cavity traversed by this hollow channel, and wherein the hollow channels in the rubber matrix intersect communicatingly either directly or in the cavities.

2. A rubber spring element as claimed in claim 1, wherein the hollow channels intersect directly outside the cavities when not more than three hollow channels not lying in one plane meet at an point of intersection.

3. A rubber spring element as claimed in claim 1, wherein the point of intersection of the hollow channels lies inside a cavity, particularly when more than two hollow channels meet at such an intersection point in one plane.

4. A rubber spring element as claimed in claim 1, wherein the cavities are spherical in shape and the hollow channels have a circular cylindrical configuration.

5. A rubber spring element as claimed in claim 1, wherein the hollow channels are disposed in planes aligned at right angles to the load vector of a load which is intended to be taken by the spring element.

6. A rubber spring element as claimed in claim 5, which has at least two such planes of cavities and hollow channels, which planes lie one above the other in the direction of the imposed load vector, without intersecting or touching one another, in such a manner that the points of intersection of the hollow channels are mutually staggered from plane to plane.

7. A rubber spring element as claimed in claim 5, wherein the hollow channels lying in one respective plane form an orthogonal or hexagonal two-dimensional lattice.

8. A rubber spring element as claimed in claim 5, wherein the hollow channels of a plane are so disposed as to extend radially in a disk-shaped or prismatic rubber matrix with equal angular spacing, and intersect in a central cavity.

9. A rubber spring element as claimed in claim 1, wherein the hollow channels and the cavities are uniformly distributed spatially in the rubber matrix and together form a relatively highly symmetrical, particularly a cubic, hexagonal or tetragonal space lattice network.

10. A rubber spring element as claimed in claim 1, wherein the hollow channels are open at at least one end.

11. A method of producing the rubber spring element as claimed in claim 1 by compression molding or injection molding of a rubber mixture in a mold nest, which is traversed by mold cores, of a molding tool, wherein use is made of reusable pushed mold cores.

* * * * *